US011658558B2

(12) United States Patent
Takenaka et al.

(10) Patent No.: US 11,658,558 B2
(45) Date of Patent: May 23, 2023

(54) ZETA CONVERTER GENERATING CONTROL POWER FROM AN INTERNAL NODE

(71) Applicant: Panasonic Intellectual Property Management Co., Ltd., Osaka (JP)

(72) Inventors: Kazuo Takenaka, Osaka (JP); Takashi Higashide, Osaka (JP); Katsunori Atago, Fukushima (JP); Youichi Kageyama, Osaka (JP); Hisao Hiragi, Osaka (JP); Yugo Setsu, Osaka (JP); Hiroki Nishinaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 17/286,902

(22) PCT Filed: Dec. 18, 2019

(86) PCT No.: PCT/JP2019/049641
§ 371 (c)(1),
(2) Date: Apr. 20, 2021

(87) PCT Pub. No.: WO2020/149084
PCT Pub. Date: Jul. 23, 2020

(65) Prior Publication Data
US 2021/0351692 A1 Nov. 11, 2021

(30) Foreign Application Priority Data
Jan. 16, 2019 (JP) .............................. JP2019-004887

(51) Int. Cl.
*H02M 3/00* (2006.01)
*H02M 1/00* (2006.01)
*H02M 1/36* (2007.01)

(52) U.S. Cl.
CPC ........... *H02M 1/0006* (2021.05); *H02M 1/36* (2013.01); *H02M 3/005* (2013.01)

(58) Field of Classification Search
CPC ......................... H02M 1/0006; H02M 3/0005
See application file for complete search history.

(56) References Cited

U.S. PATENT DOCUMENTS

| 9,998,001 B1 * | 6/2018 | Daly .......................... G05F 1/46 |
| 2009/0015299 A1 | 1/2009 | Ryu et al. |
| 2012/0200275 A1 * | 8/2012 | Ribarich ................. H02M 1/36 323/282 |

FOREIGN PATENT DOCUMENTS

| JP | 2009-020641 | 1/2009 |
| JP | 2016-100588 A | 5/2016 |

OTHER PUBLICATIONS

The Extended European Search Report dated Feb. 15, 2022 for the related European Patent Application No. 19910903.4.
(Continued)

*Primary Examiner* — Peter M Novak
(74) *Attorney, Agent, or Firm* — McDermott Will & Emery LLP (57) ABSTRACT

A DC-DC converter includes a switch element connected to an input end, a coupling capacitor connected to the switch element at a first node, a first inductor connected to the coupling capacitor at a second node and connected to an output end at a third node, a control circuit that controls the switch element, a second inductor connected to the first node and a ground, a first diode connected to the second node and the ground, a smoothing capacitor connected to the third node and the ground, a comparator, a second diode connected to the second node and the comparator to supply a power voltage powering the comparator, and an output capacitor connected to the second diode and the ground. The comparator compares a voltage at the output end with a
(Continued)

reference voltage so as to output a comparison result to the control circuit. This DC-DC converter operates stably.

15 Claims, 6 Drawing Sheets

(56) References Cited

OTHER PUBLICATIONS

"Babu P Ramesh et al: ""Simulation andperformance analysis of CCM Zeta converter with PID controller""", 2015 International Conference on Circuits, Power and Computing Technologies [ICCPCT-2015], IEEE, Mar. 19, 2015 (Mar. 19, 2015), pp. 1-7, XP033175837". International Search Report of PCT application No. PCT/JP2019/049641 dated Jan. 28, 2020.

* cited by examiner

ZETA CONVERTER GENERATING CONTROL POWER FROM AN INTERNAL NODE

CROSS-REFERENCE TO RELATED APPLICATIONS

This application is a U.S. national stage application of the PCT international application No. PCT/JP2019/049641 filed on Dec. 18, 2019, which claims the benefit of foreign priority of Japanese patent application No. 2019-004887 filed on Jan. 16, 2019, the contents all of which are incorporated herein by reference.

TECHNICAL FIELD

The present disclosure relates to a DC-DC converter used in various electronic apparatuses.

BACKGROUND ART

Figure 6:
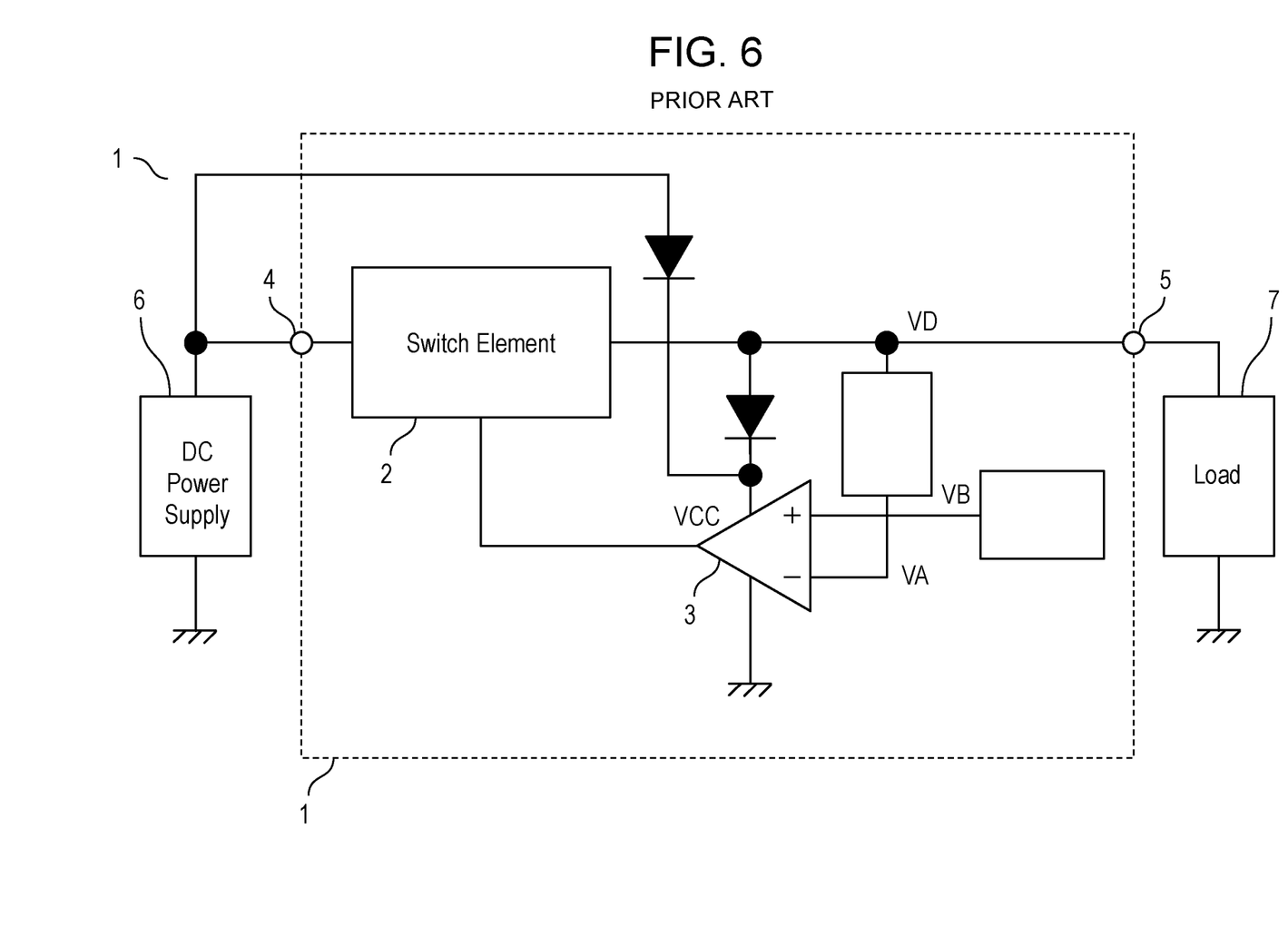
FIG. 6 is a circuit block diagram of a conventional DC-DC converter.

FIG. 6 is a circuit block diagram of conventional DC-DC converter 1. DC-DC converter 1 includes converter section 2, comparator 3, input end 4, and output end 5. DC power supply 6 is connected to input end 4. Load 7 is connected to output end 5. DC-DC converter 1 stabilizes a voltage supplied to load 7 via output end 5 by comparing a voltage at output end 5 with reference voltage VB and controlling converter section 2 according to a comparison result.

PTL1 discloses a conventional DC-DC converter similar to DC-DC converter 1.

CITATION LIST

Patent Literature

PTL1: Japanese Patent Laid-Open Publication No. 2009-20641

SUMMARY

ADC-DC converter includes a switch element connected to an input end, a coupling capacitor connected to the switch element at a first node, a first inductor connected to the coupling capacitor at a second node and connected to an output end at a third node, a control circuit configured to control the switch element, a second inductor connected to the first node and a ground, a first diode connected to the second node and the ground, a smoothing capacitor connected to the third node and the ground, a comparator, a second diode connected to the second node and the comparator to supply a power voltage powering the comparator, and an output capacitor connected to the second diode and the ground. The comparator is configured to compare a voltage at the output end with a reference voltage so as to output a comparison result to the control circuit.

This DC-DC converter operates stably.

DETAIL DESCRIPTION OF PREFERRED EMBODIMENT

Figure 1:
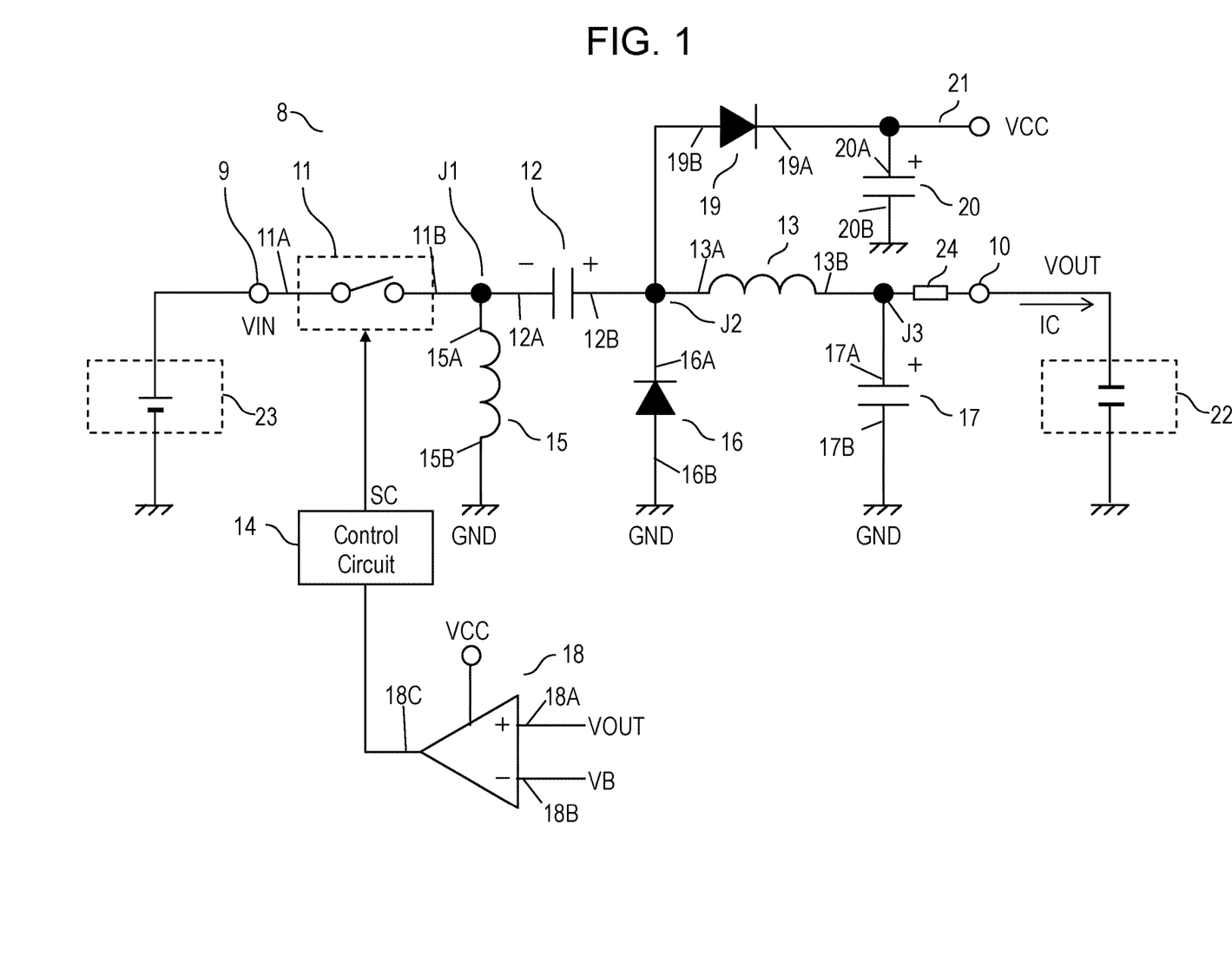
FIG. 1 is a circuit block diagram of a DC-DC converter in accordance with an exemplary embodiment.

FIG. 1 is a circuit block diagram of a DC-DC converter in accordance with an exemplary embodiment. DC-DC converter 8 includes input end 9, output end 10, switch element 11, coupling capacitor 12, inductor 13, control circuit 14, inductor 15, diode 16, smoothing capacitor 17, comparator 18, diode 19, and output capacitor 20. Switch element 11, coupling capacitor 12, and inductor 13 are connected in series to one another in this order from input end 9 to output end 10. Inductor 15 connects ground GND to node J1 at which switch element 11 is connected to coupling capacitor 12. Diode 16 connects ground GND to node J2 at which coupling capacitor 12 is connected to inductor 13. A cathode of diode 16 is connected to node J2, and an anode of diode 16 is connected to ground GND. Smoothing capacitor 17 connects ground GND to node J3 at which inductor 13 is connected to output end 10.

Comparator 18 compares output voltage VOUT at output end 10 with reference voltage VB, and outputs an operation result to control circuit 14. Control circuit 14 controls an operation of switch element 11 in response to the comparison result from comparator 18. Diode 19 is provided in supply path 21 that connects comparator 18 to node J2 at which coupling capacitor 12 is connected to inductor 13. Anode 19B of diode 19 is connected to node J2, and cathode 19A is connected to comparator 18. Supply path 21 supplies power voltage VCC powering comparator 18. Output capacitor 20 is connected to cathode 19A of diode 19 and ground GND. Switch element 11 has one end 11A connected to input end 9, and has another end 11B. Coupling capacitor 12 has one end 12A connected to another end 11B of switch element 11 at node J1, and has another end 12B. Inductor 13 has one end 13A connected to another end 12B of coupling capacitor 12 at node J2, and has another end 13B connected to output end 10 at node J3. Control circuit 14 controls switch element 11. Inductor 15 has one end 15A connected to node J1, and has another end 15B connected to ground GND. Diode 16 has cathode 16A connected to node J2, and has anode 16B connected to ground GND. Smoothing capacitor 17 has one end 17A connected to node J3, and has another end 17B connected to ground GND. Comparator 18 is powered by power voltage VCC, and is configured to compare a voltage at output end 10 with reference voltage VB, and output a comparison result to control circuit 14. Diode 19 has anode 19B connected to node J2, and has cathode 19A connected to comparator 18. Diode 19 is configured to supply power voltage VCC powering comparator 18 from cathode 19A. Output capacitor 20 has one end 20A connected to cathode 19A of diode 19, and has another end 20B connected to ground GND. Sensor 24 detects output current IC output from output end 10.

Input end 9 is configure to be connected to DC power supply 23. In accordance with the embodiment, power storage device 22 is connected to output end 10. Comparator 18 has non-inverting input end 18A to which output voltage VOUT is input, inverting input end 18B to which reference voltage VB is input, and output end 18C connected to control circuit 14. Control circuit 14 outputs control signal SC to switch element 11. Switch element 11 connects end 11A to end 11B to be turned on, and disconnects end 11A from end 11B to be turned off in response to control signal SC.

DC-DC converter 8, in operation, boosts voltage VIN at input end 9 to output voltage VOUT, and applies output voltage VOUT to output end 10.

In conventional DC-DC converter 1 shown in FIG. 6, comparator 3 is powered with power voltage VCC supplied from converter 2 or DC power supply 6. In order to allow comparator 3 to operate accurately, power voltage VCC is sufficiently higher than reference voltage VB, detected voltage VD, input voltage VA to comparator 3.

In DC-DC converter 1, converter section 2 operates to adjust an output voltage from converter section 2 to a voltage equal to or higher than a voltage of DC power supply 6. When comparator 3 receives power voltage VCC directly from DC power supply 6, power voltage VCC is close to reference voltage VB and input voltage VA, or power voltage VCC is lower than reference voltage VB and input voltage VA. As a result, comparator 3 does not operate, and therefore, an output voltage of converter section 2 may become unstable.

In contrast, DC-DC converter 8 in according to the embodiment retains a voltage at cathode 19A of diode 19 higher than output voltage VOUT at output end 10 regardless of a value of output voltage VOUT at output end 10. Cathode 19A is equivalent to a higher potential end, in particular, of output capacitor 20 in supply path 21. Accordingly, comparator 18 receives, through supply path 21, power voltage VCC higher than voltage VIN at input end 9 and reference voltage VB close to output voltage VOUT at output end 10. Comparator 18 thus receives a stable voltage from a part of DC-DC converter 8, hence stabilizing the operation of DC-DC converter 8.

Figure 2:
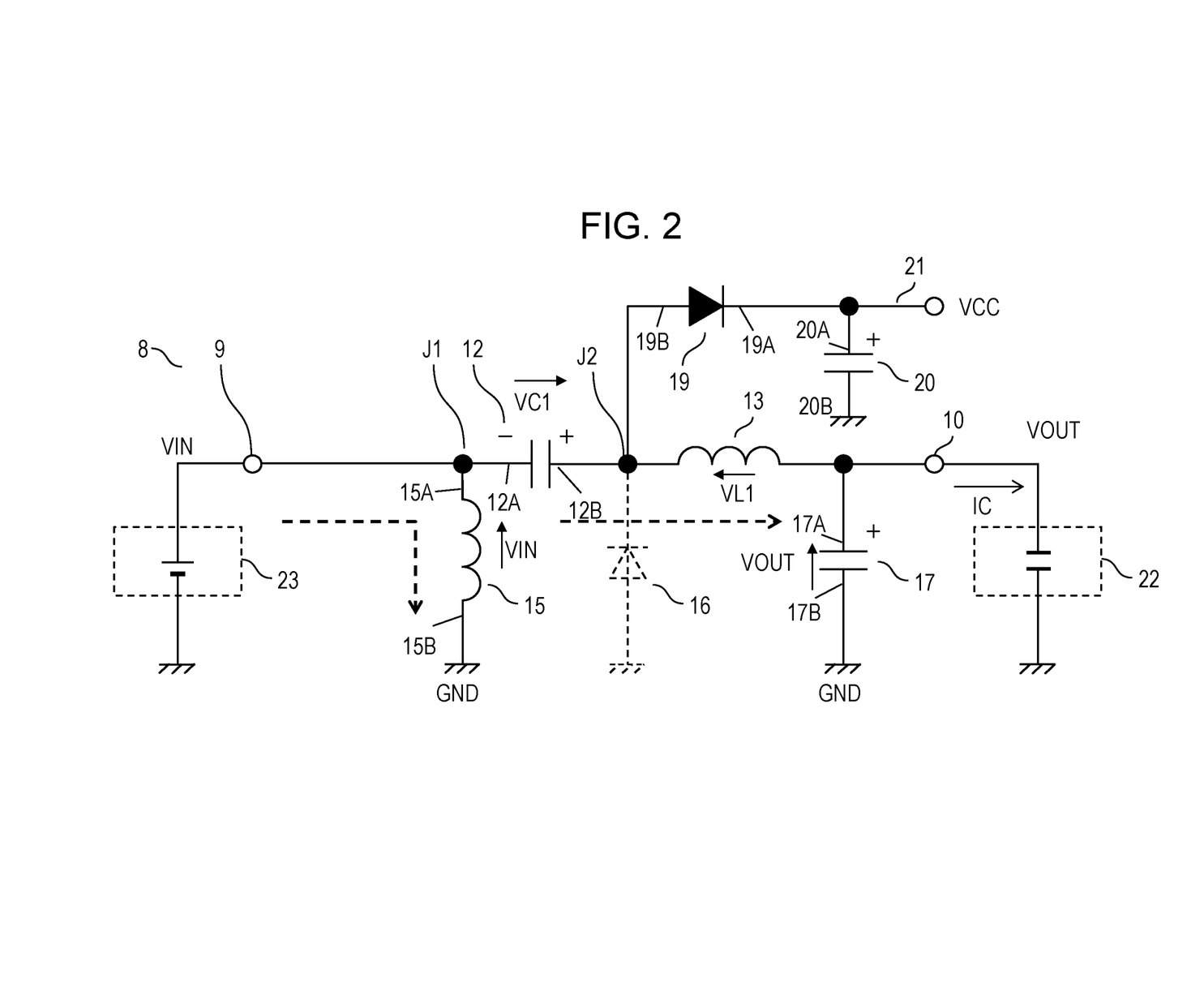
FIG. 2 is a circuit block diagram of the DC-DC converter in accordance with the embodiment in operation.
Figure 3:
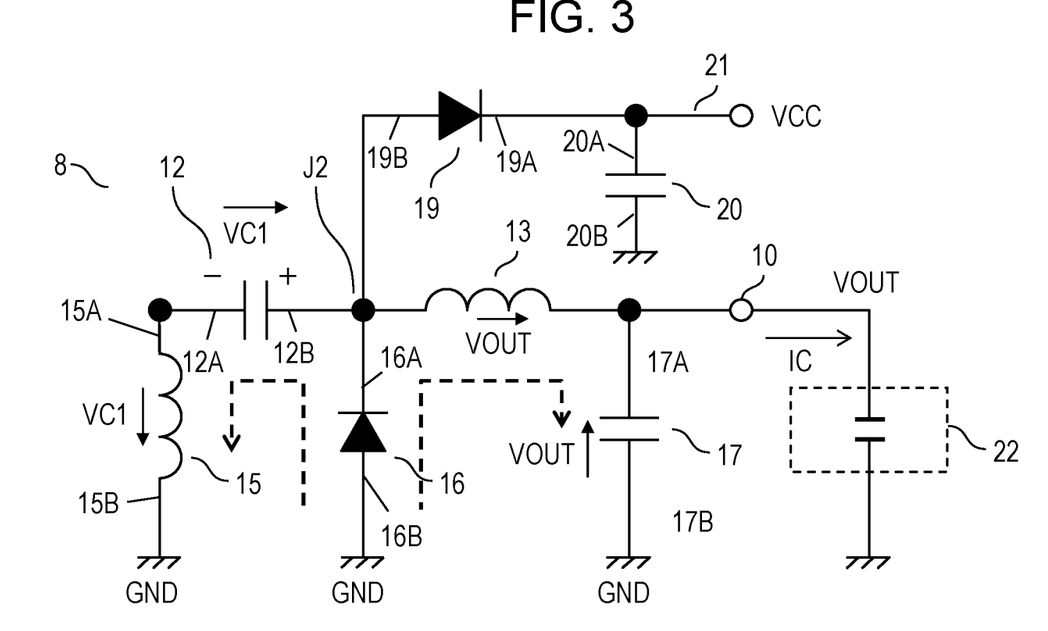
FIG. 3 is a circuit block diagram of the DC-DC converter in accordance with the embodiment in operation.

A configuration and operation of DC-DC converter 8 will be detailed below. FIG. 2 and FIG. 3 are circuit block diagrams of DC-DC converter 8 in operation.

FIG. 2 shows an outline of a circuit of DC-DC converter 8 when switch element 11 is turned on, and FIG. 3 shows an outline of the circuit of DC-DC converter 8 when switch element 11 is turned off. Power storage device 22 is connected to output end 10. In accordance with the embodiment, power storage device 22 is an electric double-layer capacitor. DC-DC converter 8 produces output voltage VOUT by boosting voltage VIN at input end 9 output from DC power supply 23. DC-DC converter 8 operates as a charger circuit charging power storage device 22 by applying output voltage VOUT from output end 10 to power storage device 22.

Figure 4:
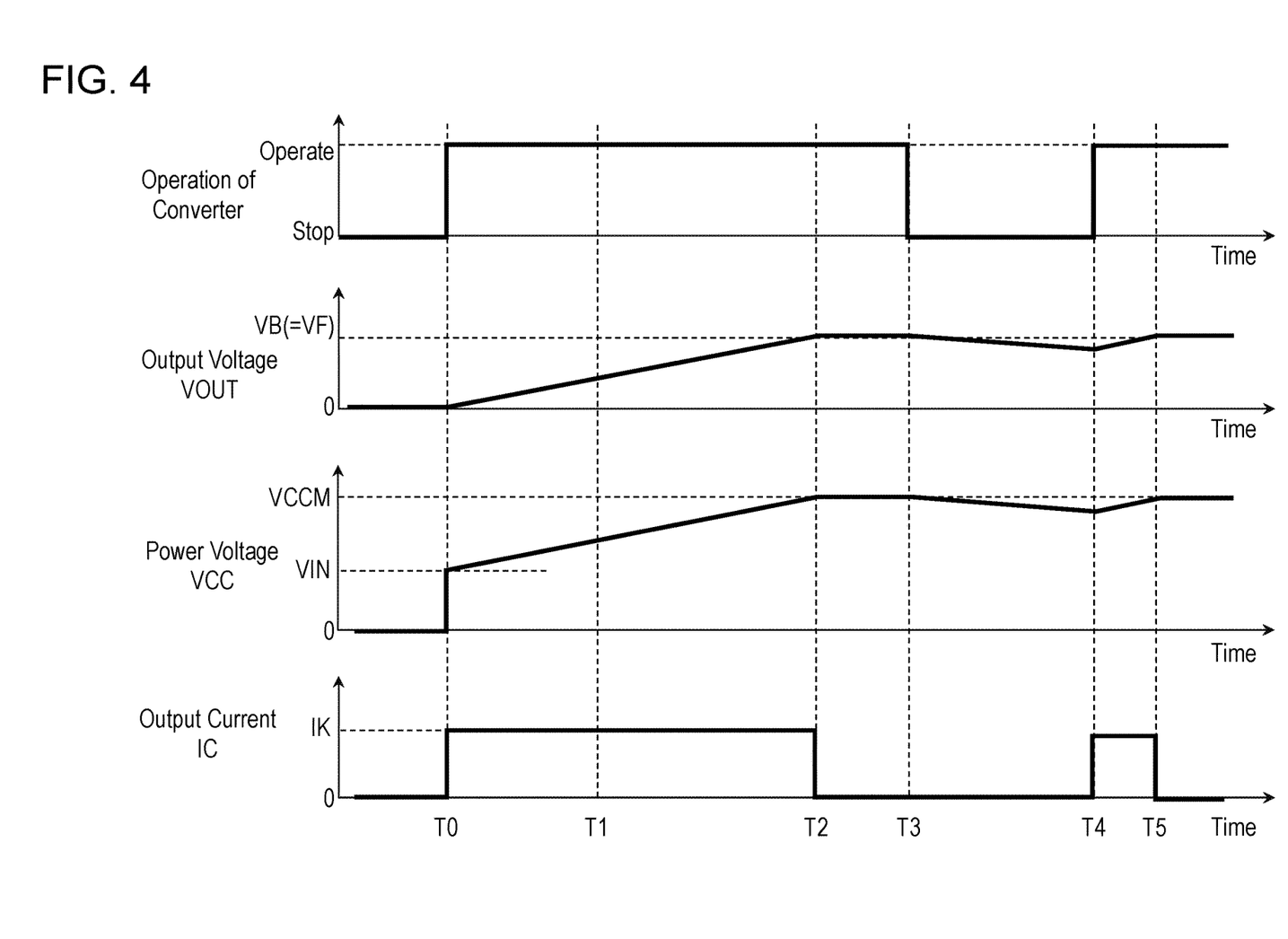
FIG. 4 shows an operation timing of the DC-DC converter in accordance with the embodiment.

FIG. 4 is an operation timing chart of DC-DC converter 8. First, at time point T0, a power supply apparatus having DC-DC converter 8 installed therein starts. Or, a signal starting DC-DC converter 8 is supplied to control circuit 14 of DC-DC converter 8. While DC-DC converter 8 operates, control circuit 14 supplies a pulse width modulation (PWM) signal to switch element 11 to control the turning on and off of switch element 11 so that output current IC for charging power storage device 22 is output from output end 10.

As shown in FIG. 2, when switch element 11 is turned on, current flows in a direction indicated by the broken line. Then, voltage VIN with polarity shown by an arrow is generated in inductor 15, and voltage VC1 with polarity shown by an arrow is generated in coupling capacitor 12 having positive electrode end 12A connected to node J2. Thus, voltage (VIN+VC1), which is a sum of voltage VIN and voltage VC1, is generated at node J2. In addition, voltage (VIN+VC1) is equal to voltage (VOUT+VL1), which is a sum of output voltage VOUT equal to a charge voltage to power storage device 22 and voltage VL1. Voltage VL1 has a polarity shown by an arrow, and is generated in inductor 13. Voltage (VIN+VC1) at node J2, i.e., voltage (VOUT+VL1), is smoothed by output capacitor 20 via diode 19 and supply path 21. The smoothed voltage is supplied to comparator 18 as power voltage VCC. At this moment, control circuit 14 controls switch element 11 according to output current IC detected by sensor 24 so that output current IC of constant current IK is supplied to power storage device 22. Output voltage VOUT equivalent to a charge voltage to power storage device 22 increases as time lapses according to the charge voltage to power storage device 22.

DC-DC converter 8 may include a sensor that detects a current passing through coupling capacitor 12 or inductor 13, instead of sensor 24 that detects output current IC. These current-detecting sensors are configured, for example, with a detection resistor connected in series to a path through which current flows. In this case, control circuit 14 detects a potential difference across both ends of the detection resistor, and control circuit 14 performs operation of a potential difference based on this potential difference to detect output current IC. Alternatively, these sensors may be a current sensor, instead of the detection resistor, that can perform non-contact detection. Control circuit 14 may detect output current IC by this current sensor.

Even in the case that the above detection resistor is inserted in a current path in series, a relation that power voltage VCC is higher than output voltage VOUT is maintained, and the DC-DC converter operates stably. In addition, a simple configuration of inserting a DC resistor allows output current IC to be detected.

At time point T0 at which DC-DC converter 8 starts to operate after a relatively long stopping period, a voltage across ends 20A and 20B of output capacitor 20 is almost 0 V. Therefore, a value of power voltage VCC for powering comparator 18 is substantially identical to voltage VIN at input end 9. A value of voltage VIN of DC power supply 23 connected to input end 9 is set to a value capable of allowing comparator 18 to operate, comparator 18 operates at time point T0. From time point T0, output voltage VOUT and power voltage VCC gradually increase by the same inclination. This shows that electric charges stored in coupling capacitor 12, smoothing capacitor 17, and power storage device 22 gradually increase with time, and that power voltage VCC is equivalent to the sum of output voltage VOUT and voltage VIN at input end 9. In accordance with the embodiment, control circuit 14 controls switch element 11 to alternately turn on and off switch element 11 repetitively by the PWM control according to detected output current IC, thereby maintaining output current IC at constant current IK for the period from time point T0 to time point T2. This operation increases output voltage VOUT and power voltage VCC linearly and gradually by the same inclination. At time point T1 between time point T0 and time point T2, control circuit 14 turns on switch element 11 to configure the circuit shown in FIG. 2, or turns off switch element 11 to configure the circuit shown in FIG. 3.

In accordance with the embodiment, reference voltage VB is identical to full charge voltage VF of power storage device 22. At time point T2 when power storage device 22 reaches the full charge state and output voltage VOUT reaches reference voltage VB, i.e., full charge voltage VF, both the value of output voltage VOUT and power voltage VCC become constant so as to maintain a predetermined potential difference between values of output voltage VOUT and power voltage VCC. In other words, DC-DC converter 8 switches from the state of constant current output operation in a period from time point T0 to time point T2 to the state of constant voltage output operation from time point T2 to time point T3 at which DC-DC converter 8 stops. At this point, power voltage VCC becomes constant voltage VCCM having a value in which voltage VL1 is added to output voltage VOUT. Capacitances of coupling capacitor 12 and smoothing capacitor 17 may be substantially the same or different. In addition, inductance values of inductor 13 and inductor 15 may be substantially the same or different.

In FIG. 2, diode 16 is indicated with a broken line since diode 16 existing as a circuit element may not affect a circuit operation, hence being neglected.

When switch element 11 is turned off, as shown in FIG. 3, current flows in a direction indicated with a dotted line, and voltage VC1 with a polarity shown by an arrow is generated across ends 15A and 15B of inductor 15 according to discharge of energy stored in inductor 15. Voltage VC1 across ends 15A and 15B of inductor 15 is generated to offset voltage VC1 in charged coupling capacitor 12 by electrically connecting diode 16 to form a closed circuit together with inductor 15 and coupling capacitor 12. Accordingly, a voltage at node J2 becomes 0 by offset of voltage VC1 across ends 12A and 12B of coupling capacitor 12 with voltage VC1 across ends 15A and 15B of inductor 15. Similarly, output voltage VOUT with a polarity shown by an arrow is generated across ends 13A and 13B of inductor 13 according to discharge of energy stored in inductor 13. Output voltage VOUT across ends 13A and 13B of inductor 13 is generated to offset output voltage VOUT across ends 17A and 17B of charged smoothing capacitor 17 by electrically connecting diode 16 to form a closed circuit together with inductor 13 and smoothing capacitor 17. Accordingly, as described above, a voltage at node J2 becomes 0 by offset of voltage VOUT across ends 17 and 17B of smoothing capacitor with voltage VOUT across ends 13A and 13B of inductor 13.

At this point, the voltage at node J2 is 0, and voltage applied to anode 19B of diode 19 is 0 as well. However, switch element 11 is repetitively turned on and off alternately at short time intervals before and after time point T1. Therefore, even when the voltage at node J2 is 0, the voltage supplied during the turning on of switch element 11 is smoothed by output capacitor 20, and power voltage VCC is continuously supplied to comparator 18. Control circuit 14 controls switch element 11 to supply output current IC of constant current IK to power storage device 22, and output voltage VOUT which is equivalent to the charge voltage increases with time according to the charge voltage of power storage device 22.

As described above, output voltage VOUT to be compared with reference voltage VB by comparator 18 is lower than power voltage VCC of comparator 18 roughly by voltage VIN supplied from DC power supply 23 in the normal state. In other words, power voltage VCC is always higher than output voltage VOUT equivalent to reference voltage VB or charge voltage. As a result, comparator 18 receives a stable voltage through supply path 21 of DC-DC converter 8, and DC-DC converter 8 operates stably.

DC-DC converter 8 performs a boosting operation boosting voltage VIN of DC power supply 23 to output voltage VOUT at output end 10 higher than voltage VIN of DC power supply 23, and supplies output current IC, i.e., constant current IK, to power storage device 22. Output voltage VOUT obtained after the boosting and is a voltage at output end 10 showing the charge state of power storage device 22, is input to comparator 18 to detect the charge state of power storage device 22. Power voltage VCC that requires a value higher than voltage VOUT to be compared is supplied from node J2 inside DC-DC converter 8 that outputs a voltage linked to output voltage VOUT. This configuration eliminates an independent power supply or a complicated voltage divider circuit to maintaining power voltage VCC for comparator 18. As a result, DC-DC converter 8 can has a small size.

Electric power supplied to comparator 18 through supply path 21 is extremely smaller than electric power supplied from output end 10 to power storage device 22. Accordingly, power supply from node J2 does not substantially affect the charging operation for power storage device 22 by DC-DC converter 8.

As described above, output voltage VOUT of DC-DC converter 8 equivalent to the charge voltage of power storage device 22 reaches full charge voltage VF at time point T2. When control circuit detects that output voltage VOUT has reached full charge voltage VF by comparator 18, DC-DC converter 8 stops the charging operation. In other words, output current IC of constant current IK is stopped. Control circuit 14 then controls switch element 11 to maintain constant output voltage VOUT applied to power storage device 22. Then, output voltage VOUT from DC-DC converter 8 becomes full charge voltage VF of constant voltage. Reference voltage VB may not necessarily be full charge voltage VF as long as reference voltage VB has a value necessary for power storage device 22.

In accordance with the embodiment, reference voltage VB is identical to full charge voltage VF. When voltage VOUT of power storage part 22 is lower than full charge voltage VF (reference voltage VB), comparator 18 does not send a signal to control circuit 14. Then, control circuit 14 controls switch element 11 to supply charge current Ic to output part 10. When voltage VOUT of power storage part 22 becomes equal to or higher than full charge voltage VF (reference voltage VB), comparator 18 sends a signal to control circuit 14. In response, control circuit 14 then controls switch element 11 not to supply charge current Ic to output part 10.

In DC-DC converter 8, input end 9 is electrically insulated from output end 10 by coupling capacitor 12 connected to nodes J1 and J2 when power is not supplied from input end 9 to output end 10. Accordingly, DC-DC converter 8 does not consume power of DC power supply 23.

For example, when comparator 23 is short-circuited and power voltage VCC forcibly becomes 0, coupling capacitor 12 cuts off power from DC power supply 23. Accordingly, short-circuiting current that affects a protective device, such as a fuse, is not generated also when the protective device is provided in series to DC power supply 23. It is thus sufficient to repair only DC-DC converter 8. As described above, no short-circuiting current is generated in DC power supply 23, enhancing safety.

At time point T3, DC-DC converter 8 stops. Although DC-DC converter 8 stops, the relation in which power voltage VCC is higher than output voltage VOUT is maintained, and both power voltage VCC and output voltage VOUT gradually decrease. In other words, power storage device 22 employing the electric double-layer capacitor allows natural discharge from output capacitor 20 and power storage device 22 to be performed at roughly the same level.

At time point T4, DC-DC converter 8 starts again. While DC-DC converter 8 is stopped from time point T3, natural discharge from output capacitor 20 and power storage device 22 are performed roughly at the same level. Therefore, the aforementioned relation between power voltage VCC and output voltage VOUT is maintained also at starting DC-DC converter 8 again at time point T4. Accordingly, comparator 18 of DC-DC converter 8 operates stably. When output voltage VOUT reaches reference voltage VB, i.e., full charge voltage VF, at time point T5, supply of output current IC is stopped, which is the same operation as that at time point T2. The operation of DC-DC converter 8 is switched to constant voltage output. In the operation of constant voltage output, DC-DC converter 8 maintains the voltage of power storage device 22, as described above. Since power is supplied intermittently from DC-DC converter 8 to power storage device 22, a power supply amount is small.

The supplying of power voltage VCC is limited to the time when DC-DC converter 8 operates. When DC-DC converter 8 is not in operation, power voltage VCC is not supplied. In other words, a period during which DC-DC converter 8 is operated, if any, is an extremely short when a vehicle having DC-DC converter 8 installed therein is not started, such as immediately before starting the vehicle or immediately after the vehicle is switched from the activation to stop state. Accordingly, power consumed by comparator 18 during the stop period of vehicle, i.e., a dark current for operating comparator 18, does not exist. As a result, degradation of DC power supply 23 can also be suppressed.

Figure 5:
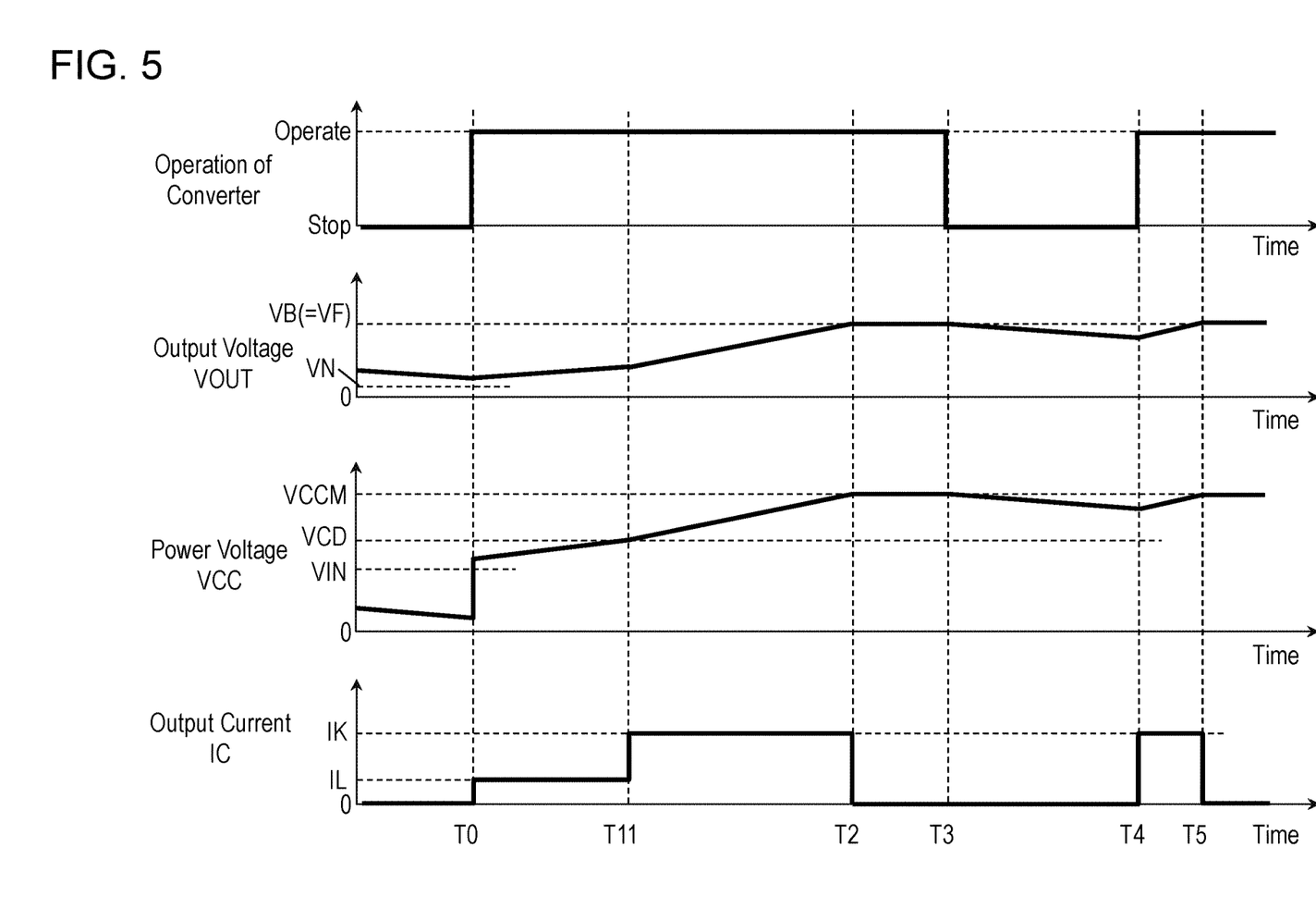
FIG. 5 shows an operation timing of the DC-DC converter in accordance with the embodiment.

In accordance with the embodiment, in order to allow comparator 18 to operate properly at starting of DC-DC converter 8, control circuit 14 may provide a soft start to switch element 11 in a period until power voltage VCC reaches a predetermined value sufficient for properly operating comparator 18. FIG. 5 is an operation timing chart for the soft start of DC-DC converter 8. When DC-DC converter 8 is restarted while a voltage remaining in power storage device 22, i.e., output voltage VOUT at output end 10, is high while DC-DC converter 8 is stopped, power voltage VCC is not sufficiently high relative to high output voltage VOUT at output end 10 that is equivalent to the voltage remaining in power storage device 22. This may result in inappropriate control of output current IC due to inability to properly operate comparator 18.

In the operation shown in FIG. 5, control circuit 14 detects output voltage VOUT at output end 10 to detect power voltage VCC before driving switch element 11 when DC-DC converter 8 starts at time point T0. When output voltage VOUT is higher than predetermined voltage value VN and power voltage VCC is lower than predetermined voltage value VCD, control circuit 14 provides soft start to DC-DC converter 8 by suppressing output current IC to current value IL smaller than constant current IK. This protects DC-DC converter 8 and power storage device 22. As output voltage VOUT increases by applying output current IC of current value IL to power storage device 22 at time point T0, and power voltage VCC reaches predetermined voltage value VCD at time point T11, control circuit 14 controls switch element 11 such that output current IC becomes constant current IK from time point T11. In other words, a period of applying the soft start can be a short period from the start of DC-DC converter 8 until output capacitor 20 is charged. While DC-DC converter 8 is stopped, particularly while the electric double-layer capacitor is left unworked, a voltage of the electric double-layer capacitor may be maintained at a left-unworked voltage with a low value so as to suppress degradation of characteristics of the electric double-layer capacitor. For example, in the case that the electric double-layer capacitor is used as power storage device 22, predetermined voltage value VN at output end 10 is determined according to the left-unworked voltage such that voltage value VN is determined to be equal to the left-unworked voltage or a voltage higher than the left-unworked voltage by an additional voltage value. The additional voltage value may be a constant voltage value of several volts or a value provided by adding tens of percent of fixed rate to the voltage value maintained while the electric double-layer capacitor is left unworked.

After stopping at time point T3, output voltage VOUT is higher than predetermined voltage VN and power voltage VCC is higher than predetermined voltage value VCD when DC-DC converter 8 starts again at time point T4. Therefore, control circuit 14 controls switch element 11 such that output current IC becomes constant current IK, not current value IL, and the soft start is not applied.

At the starting of DC-DC converter 8, when power voltage VCC is not less than predetermined voltage value VCD, control circuit 14 controls switch element 11 such that output current IC becomes constant current IK regardless of output voltage VOUT. At the starting of DC-DC converter 8, when output voltage VOUT is higher than predetermined voltage value VN and power voltage VCC is lower than predetermined voltage value VCD, control circuit 14 controls switch element 11 such that output current IC becomes current value IL smaller than constant current IK. Then, when power voltage VCC reaches predetermined voltage value VCD, control circuit 14 controls switch element 11 such that output current IC becomes constant current IK.

The soft start may be always applied when control circuits 14 starts to drive switch element 11 regardless of output voltage VOUT.

The above description basically refers to the operation of DC-DC converter 8 to charge power storage device 22 by constant current output, and the constant voltage output operation to maintain the charge voltage of power storage device 22 by increased voltage after reaching the full charge voltage or target charge voltage. However, DC-DC converter 8 may be operated as a step-down converter, as required, to decrease output voltage VOUT below voltage VIN at input end 9.

REFERENCE MARKS IN THE DRAWINGS

8 DC-DC converter
9 input end
10 output end
11 switch element
12 coupling capacitor
13 inductor (first inductor)
14 control circuit
15 inductor (second inductor)
16 diode (first diode)
17 smoothing capacitor
18 comparator
19 diode (second diode)
20 output capacitor
21 supply path
22 power storage device
DC power supply
J1 node (first node)
J2 node (second node)
J3 node (third node)

The invention claimed is:
1. A DC-DC converter comprising:
an input end;
an output end;

a switch element having one end and another and, the one end of the switching element being connected to the input end;

a coupling capacitor having one end and another end, the one end of coupling capacitor being connected to the another end of the switch element at a first node;

a first inductor having one end and another end, the one end of the first inductor being connected to the another end of the coupling capacitor at a second node, the another end of first inductor being connected to the output end at a third node;

a control circuit configured to control the switch element;

a second inductor having one end and another end, the one end of the second inductor being connected to the first node, the another end of the second inductor being connected to a ground;

a first diode having a cathode and an anode, the cathode of the first diode being connected to the second node, the anode of the first diode being connected to the ground;

a smoothing capacitor having one end and another end, the one end of the smoothing capacitor being connected to the third node, the another end of the smoothing capacitor being connected to the ground;

a comparator configured to be powered with a power voltage, and to compare a voltage at the output end with a reference voltage so as to output a comparison result to the control circuit;

a second diode having an anode and a cathode, the anode of the second diode being connected directly to the second node, the cathode of the second diode being connected directly to the comparator, the second diode being configured to supply the power voltage from the cathode to the comparator, the cathode of the second diode being configured to have a higher voltage than the output terminal; and an output capacitor having one end and another end, the one end of the output capacitor being connected to the cathode of the second diode, the another end of the output capacitor being connected to the ground.

2. The DC-DC converter according to claim 1, wherein the control circuit is configured to control the switch element to output a constant current from the output end of the switch element.

3. The DC-DC converter according to claim 1, wherein the DC-DC converter is configured to boost a voltage at the input end, and apply the boosted voltage to the output end.

4. The DC-DC converter according to claim 1, wherein the control circuit is configured to:
 detect the voltage at the output end before driving the switch element, and
 control the switch element to start the DC-DC converter by a soft start when the voltage at the output end detected before driving the switch element is higher than a predetermined voltage value.

5. The DC-DC converter according to claim 4, wherein a power storage device is connected to the output end,
 when the DC-DC converter stops, the power storage device is left unworked with a left-unworked voltage, the left-unworked voltage being a voltage suppressing degradation of characteristics of the power storage device, and
 the predetermined voltage value is determined according to the left-unworked voltage of the power storage device.

6. The DC-DC converter according to claim 1, wherein, at restarting the DC-DC converter, the control circuit is configured to:
 when the power voltage is not less than a first predetermined voltage value, control the switch element such that an output current output from the output end becomes a constant current value;
 when the voltage at the output end is higher than a second predetermined voltage value and the power voltage is lower than the first predetermined voltage value, control the switch element such that the output current is smaller than the constant current value; and
 when the power voltage is greater than or equal to the first predetermined voltage value, control the switch element to maintain the output current at the constant current value.

7. The DC-DC converter according to claim 6, wherein the output end is configured to be connected to a power storage device,
 when the DC-DC converter stops, the power storage device is left unworked with a left-unworked voltage, the left-unworked voltage being a voltage suppressing degradation of characteristics of the power storage device, and
 the second predetermined voltage value is determined according to the left-unworked voltage of the power storage device.

8. The DC-DC converter according to claim 1, wherein, at restarting the DC-DC converter, the control circuit is configured to:
 when the power voltage is not less than a first predetermined voltage value, control the switch element such that the output current becomes the constant current value regardless of the voltage at the output end;
 when the voltage at the output end is higher than a second predetermined voltage value and the power voltage is lower than the first predetermined voltage value, control the switch element such that the output current is smaller than the constant current value; and
 when the power voltage is greater than or equal to the first predetermined voltage value, control the switch element to maintain the output current at the constant current value.

9. The DC-DC converter according to claim 8, wherein:
 the output end is connected to a power storage device,
 when the DC-DC converter stops, the power storage device is left unworked with a left-unworked voltage, the left-unworked voltage being a voltage suppressing degradation of characteristics of the power storage device, and
 the second predetermined voltage value is determined according to the left-unworked voltage value of the power storage device.

10. A DC-DC converter comprising:
 an input end;
 an output end;
 a switch element having one end and another and, the one end of the switching element being connected to the input end;
 a coupling capacitor having one end and another end, the one end of coupling capacitor being connected to the another end of the switch element at a first node;
 a first inductor having one end and another end, the one end of the first inductor being connected to the another end of the coupling capacitor at a second node, the another end of first inductor being connected to the output end at a third node;

a control circuit configured to control the switch element;
a second inductor having one end and another end, the one end of the second inductor being connected to the first node, the another end of the second inductor being connected to a ground;
a first diode having a cathode and an anode, the cathode of the first diode being connected to the second node, the anode of the first diode being connected to the ground;
a smoothing capacitor having one end and another end, the one end of the smoothing capacitor being connected to the third node, the another end of the smoothing capacitor being connected to the ground;
a comparator configured to be powered with a power voltage, and to compare a voltage at the output end with a reference voltage so as to output a comparison result to the control circuit;
a second diode having an anode and a cathode, the anode of the second diode being connected to the second node, the cathode of the second diode being connected to the comparator, the second diode being configured to supply the power voltage from the cathode to the comparator; and
an output capacitor having one end and another end, the one end of the output capacitor being connected to the cathode of the second diode, the another end of the output capacitor being connected to the ground,
wherein, at restarting the DC-DC converter, the control circuit is configured to:
when the power voltage is not less than a first predetermined voltage value, control the switch element such that an output current output from the output end becomes a constant current value;
when the voltage at the output end is higher than a second predetermined voltage value and the power voltage is lower than the first predetermined voltage value, control the switch element such that the output current is smaller than the constant current value; and
when the power voltage is greater than or equal to the first predetermined voltage value, control the switch element to maintain the output current at the constant current value.

11. The DC-DC converter according to claim 10, wherein:
the output end is connected to a power storage device,
when the DC-DC converter stops, the power storage device is left unworked with a left-unworked voltage, the left-unworked voltage being a voltage suppressing degradation of characteristics of the power storage device, and
the second predetermined voltage value is determined according to the left-unworked voltage value of the power storage device.

12. The DC-DC converter according to claim 10, wherein the DC-DC converter is configured to boost a voltage at the input end, and apply the boosted voltage to the output end.

13. A DC-DC converter comprising:
an input end;
an output end;
a switch element having one end and another and, the one end of the switching element being connected to the input end;
a coupling capacitor having one end and another end, the one end of coupling capacitor being connected to the another end of the switch element at a first node;
a first inductor having one end and another end, the one end of the first inductor being connected to the another end of the coupling capacitor at a second node, the another end of first inductor being connected to the output end at a third node;
a control circuit configured to control the switch element;
a second inductor having one end and another end, the one end of the second inductor being connected to the first node, the another end of the second inductor being connected to a ground;
a first diode having a cathode and an anode, the cathode of the first diode being connected to the second node, the anode of the first diode being connected to the ground;
a smoothing capacitor having one end and another end, the one end of the smoothing capacitor being connected to the third node, the another end of the smoothing capacitor being connected to the ground;
a comparator configured to be powered with a power voltage, and to compare a voltage at the output end with a reference voltage so as to output a comparison result to the control circuit;
a second diode having an anode and a cathode, the anode of the second diode being connected to the second node, the cathode of the second diode being connected to the comparator, the second diode being configured to supply the power voltage from the cathode to the comparator; and
an output capacitor having one end and another end, the one end of the output capacitor being connected to the cathode of the second diode, the another end of the output capacitor being connected to the ground,
wherein, at restarting the DC-DC converter, the control circuit is configured to:
when the power voltage is not less than the first predetermined voltage value, control the switch element such that the output current becomes the constant current value regardless of the voltage at the output end;
when the voltage at the output end is higher than a second predetermined voltage value and the power voltage is lower than the first predetermined voltage value, control the switch element such that the output current is smaller than the constant current value; and
when the power voltage is greater than or equal to the first predetermined voltage value, control the switch element to maintain the output current at the constant current value.

14. The DC-DC converter according to claim 13, wherein:
the output end is configured to be connected to a power storage device,
when the DC-DC converter stops, the power storage device is left unworked with a left-unworked voltage, the left-unworked voltage being a voltage suppressing degradation of characteristics of the power storage device, and
the second predetermined voltage value is determined according to the left-unworked voltage value of the power storage device.

15. The DC-DC converter according to claim 13, wherein the DC-DC converter is configured to boost a voltage at the input end, and apply the boosted voltage to the output end.

* * * * *